United States Patent [19]

Webb et al.

[11] 3,950,640

[45] Apr. 13, 1976

[54] LAMP CONTROL AND LAMP SWITCH CIRCUIT FOR CONTROLLING LIGHT BALANCE

[75] Inventors: Douglas E. Webb, Rochester; Russell G. Schroeder, II, Webster, both of N.Y.

[73] Assignee: Xerox Corporation, Stamford, Conn.

[22] Filed: Apr. 17, 1975

[21] Appl. No.: 568,967

Related U.S. Application Data

[62] Division of Ser. No. 416,921, Nov. 19, 1973, Pat. No. 3,904,922.

[52] U.S. Cl. .................. 250/205; 250/227; 315/149

[51] Int. Cl.[2] .............................................. G01J 1/32

[58] Field of Search ............ 250/205, 227; 315/149, 315/150

[56] References Cited

UNITED STATES PATENTS

| | | | |
|---|---|---|---|
| 3,558,892 | 1/1971 | Seeley | 250/205 |
| 3,590,259 | 6/1971 | Johnston | 250/205 |
| 3,796,866 | 3/1974 | McClellan | 250/205 |

*Primary Examiner*—Alfred E. Smith
*Assistant Examiner*—David K. Moore
*Attorney, Agent, or Firm*—James J. Ralabate; Michael H. Shanahan; Gaetano D. Maccarone

[57] ABSTRACT

Control and switching circuits for maintaining appropriate balance of light output of a long multi-vapor arc lamp. The control circuit includes sensing, amplifier-reference, phase amplitude detector, time base generator and lamp switching logic branches. The switching circuit includes a silicon controlled rectifier bridge for reversing the polarity of current flow through the lamp. The silicon controlled rectifier bridge is triggered by output pulse chains from the lamp switching logic branch in the control circuit.

28 Claims, 13 Drawing Figures

LAMP CONTROL AND LAMP SWITCH CIRCUIT FOR CONTROLLING LIGHT BALANCE

This is a divisional application of Ser. No. 416,921, filed Nov. 19, 1973, now U.S. Pat. No. 3,904,922.

BACKGROUND OF THE INVENTION

This invention relates generally to lamp control and lamp switch circuits and more particularly, to electrical circuits for controlling and maintaining the appropriate balance of light output, end-to-end of a long multi-vapor arc lamp.

In the photoelectrophoretic imaging process, black and white or full color images are formed through the use of photoelectrophoresis. An extensive and detailed description of the photoelectrophoretic process is found in U.S. Pat. Nos. 3,384,488 and 3,384,565 to Tulagin and Carreira, 3,383,933 to Yeh and 3,384,566 to Clark, which disclose a system where photoelectrophoretic particles migrate in image configuration providing a visual image at one or both of two electrodes between which the particles suspended within an insulating carrier is placed. The particles are photosensitive and are believed to bear a net electrical charge while suspended which causes them to be attracted to one electrode and apparently undergo a net change in polarity upon exposure to activating electromagnetic radiation. The particles will migrate from one of the electrodes under the influence of an electric field through the liquid carrier to the other electrode.

The photoelectrophoretic imaging process is either monochromatic or polychromatic depending upon whether the photosensitive particles within the liquid carrier are responsive to the same or different portions of the light spectrum. A fullcolor polychromatic system is obtained, for example, by using cyan, magenta and yellow-colored particles which are responsive to red, green and blue light respectively.

It has been found that long multi-vapor lamps with their high efficiencies and controllable spectral outputs show great promise in producing optimum results in photographic system using artificial light. The most important factor in controlling the spectral energy distribution uniformity along the length of the lamp is the metal halide materials present in the vapor. For example, in the photoelectrophoretic imaging process using opaque or transparent originals, selecting appropriate metal halide materials and balancing their ratios to match photoelectrophoretic pigment sensitivities for the best process response is a major area of concern. Some long multi-vapor arc lamps in commercial use require about 2 mg. or mercury to facilitate starting. In connection with certain photoelectrophoretic imaging operations, the photoelectrophoretic process should not "see" the spectral emission lines of mercury vapor for optimum images. In other photoelectrophoretic imaging systems, mercury may be virtually absent from the lamps used, nevertheless, there are special characteristics and problems associated with them. For example, as soon as the lamp is ignited, the metal halide materials within the lamp tends to selectively migrate to one end of the lamp with a resultant end-to-end unbalance in light output. This migration of materials is called cataphoretic migration.

Other inventions have been discovered for controlling the operation of the lamp intensity of vapor lamps. One such process is disclosed in the patent to Dessoulavy et al, U.S. Pat. No. 3,514,667 issued May 26, 1970. This patent shows a circuit for controlling operation of a discharge tube which includes rectifier means for converting current from an alternating current source into direct current to be delivered to the tube. The rectifier includes controlled rectifier elements having control terminals or gates, and controllable supply of impulses operable to determine the portion of a cycle of alternating current supply during which direct current flows through the tube. However, this patent is not concerned with the drawbacks of cataphoretic migration in long multi-vapor arc lamps.

Accordingly, it is an object of this invention to provide an electrical control system for maintaining appropriate balance of light output along the length of long multi-vapor arc lamps.

Another object of this invention is to compensate for changes in spectral energy distribution of long multi-vapor arc lamps with operating time and variations from lamp to lamp.

A further object of this invention is to provide for effects of ambient temperature cooling of long multi-vapor arc lamps end-to-end.

It is another object of this invention to employ a lamp switching circuit to periodically reverse the direction of current flow through long multi-vapor arc lamps for use in photoelectrophoretic imaging systems.

Another object of this invention is to control the relative dwell times of the two polarities of alternating voltage supply source to long multi-vapor arc lamps in order to prevent the same migrations that can also be contributed to by differential end-to-end temperatures of the lamp and end-to-end imperfections in the lamp.

Another object of this invention is to provide control circuits for starting and operating long multi-vapor arc lamps.

Still a further object of this invention is to improve the application of long multi-vapor arc lamps to photoelectrophoretic imaging techniques.

SUMMARY OF THE INVENTION

These and other objects of this invention are accomplished by providing a lamp sensing circuit for detecting light intensity differences at opposite ends of a lamp using a single photodiode.

The signal from the photodiode, which may be sinusoidal, is detected, amplified and then split into two signals, equal in amplitude and separated in phase by 180°. The reference signal out of the chopper driver is shifted to be exactly in phase with the signal from the photodiode. The reference signal is then simultaneously squared and split into two signals separated in phase by 180°.

The two reference square waves gate four linear amplifiers of the phase-amplitude detector on and off. Two amplifiers are "on" and two are "off" at any given instant in time. Two amplifiers are capable of positive (+) outputs only, and two are capable of negative (−) outputs only.

The "D.C." output signal from the phase amplitude detector is used to control the period of time between alternating pairs of pulses in a pulse chain in a time base generator. The time period between the other alternate pairs of pulses in the pulse chain may be a fixed time interval. The time variance of the variable half of each period is proportional to the phase amplitude detector D.C. output signal. The peak amplitude of this varying D.C. signal is proportional to the imbalance of the lamp and the polarity indicates the direction of any such imbalance.

The direction of current flow in the lamp is reversed by triggering "on" two SCR's in a bridge circuit that were not conducting. When a set of SCR's in the bridge are triggered "on", this immediately places each of the two "commutating" capacitors across the connected conducting SCR's applying a reverse bias potential to that SCR equal to the lamp voltage. The initially conducting SCR's are "cut-off" by the applied reverse bias. The capacitors discharge through the newly conducting SCR's, the previous current conducting inductors and the lamp. The current flow continues in the same direction as the lamp half cycle just being completed. The capacitors then reverse charge as the lamp begins to conduct in the new direction.

DESCRIPTION OF THE DRAWINGS

These and other objects and advantages will become apparent to those skilled in the art after reading the following description taken in conjunction with the accompanying drawings wherein:

FIGS. 8*a–d* are connected together.

DESCRIPTION OF THE PREFERRED EMBODIMENTS

The invention herein is described and illustrated in a specific embodiment having specific components listed for carrying out the functions of the apparatus. Nevertheless, the invention need not be thought of as being confined to such specific showing and should be construed broadly within the scope of the claims. Any and all equivalent structures known to those skilled in the art can be substituted for specific apparatus disclosed as long as the substituted apparatus achieves a similar function. It may be that other apparatus will be invented having similar needs to those fulfilled by the apparatus described and claimed herein and it is the intention herein to described an invention for use in apparatus other than the embodiment shown.

Figure 1:
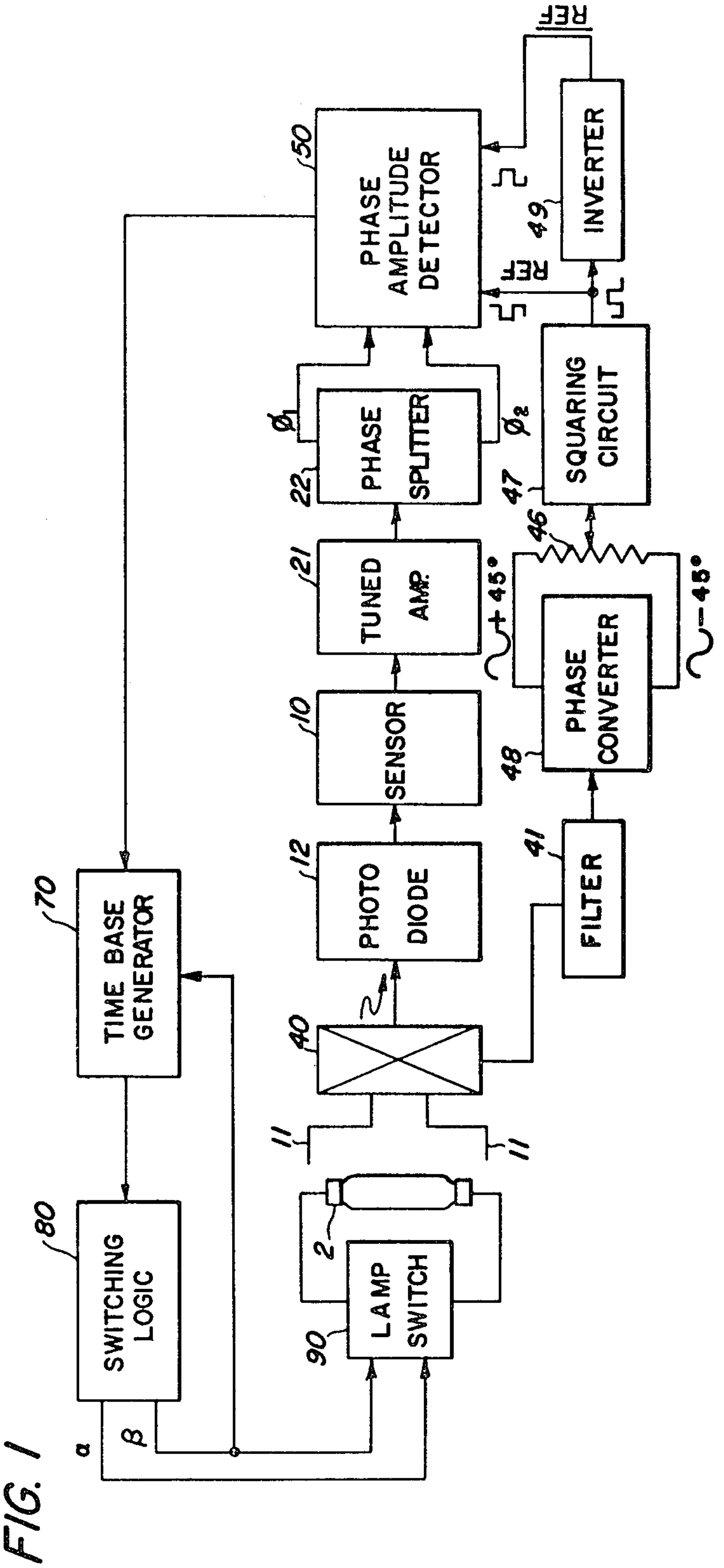
FIG. 1 illustrates a simplified block diagram of the lamp control and lamp switch according to this invention.
Figure 9:
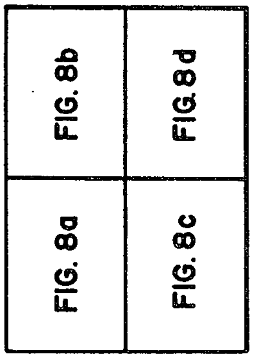
FIG. 9 shows how

FIG. 1 illustrates in block diagram form the lamp control and lamp switch circuits according to this invention. The lamp 2 is mounted for exposure within an imaging system which, in a preferred embodiment, may be a photoelectrophoretic imaging system. The photoelectrophoretic imaging process is described in detail in U.S. patents referred to hereinearlier. The lamp 2 may be a metal halide lamp about 15 inches in length.

In operation, the light signal, alternating from end-to-end of the lamp 2, is sampled to a single silicon photodiode 12. The photodiode 12 is looking at apertures of two light pipes 11, one from each end of the lamp 2. The light, in one embodiment, may be fed to the photodiode 12 through a red filter (not shown) and a light chopper 40.

The light chopper 40 may be a tuning fork clock unit with movable chopper vanes (not shown) driven at sinusoidal velocity to alternately sample light from the light pipes 11 to photodiode 12. Many chopper configurations are as useable as the tuning fork clock unit. For example, the light chopper may be a machine driven rotating disk. To minimize interference, the chopper vanes are driven at a constant frequency other than power line frequencies, or multiples thereof, used near the system. For example, a suitable frequency of 1.0 KHz may be used as the frequency of the chopper vanes.

It is appreciated that the light pipes 11 apertures and the position and motion of the light chopper 40 chopper vanes may be adjusted to produce a D.C., plus sinusoidal output signal from the photodiode 12 whenever the light pipes 11 are transmitting different light intensity levels. Although a sinusoidal signal is preferred for the output from photodiode 12, a sinusoidal signal is not required. For example, the output signal may be in the form of a square wave. The alternating component of the D.C., plus sinusoidal signal is at the same 1.0 KHz frequency as that of the chopper vanes. It should be apparent that the peak-to-peak amplitude of the D.C., plus sinusoidal signal produced from the photodiode 12 is proportional to the difference in light intensity levels transmitted to it by the two light pipes. The photodiode 12 output signal is coupled into the sensing circuit 10.

SENSING CIRCUIT

Figure 8A:
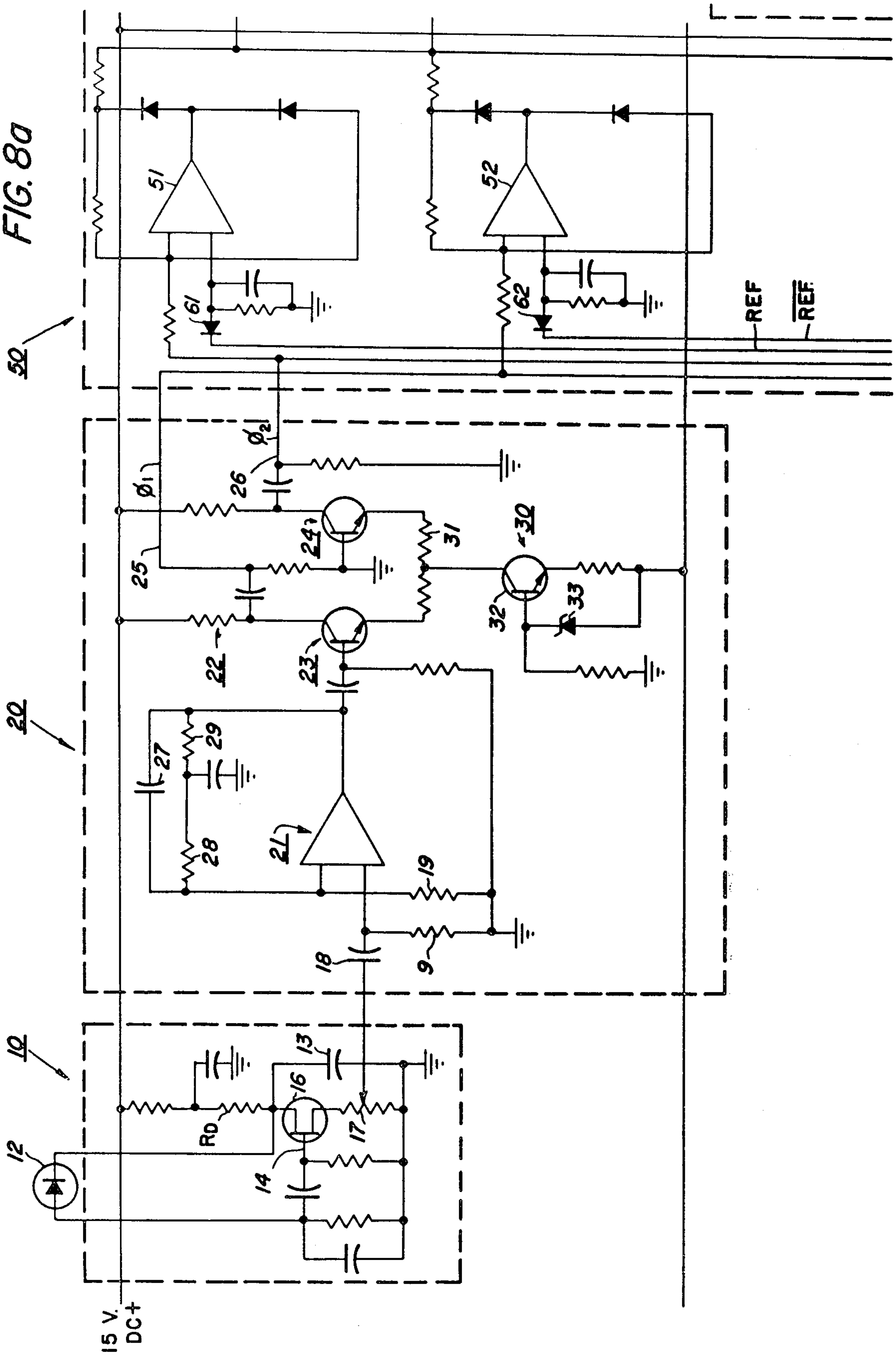
FIGS. 8*a–d* combine to form a schematic circuit diagram of the lamp control circuit according to this invention.

FIG. 8*a* shows a typical arrangement for the sensing circuit 10 used to detect the photodiode output signal. The sensing circuit 10 includes the field-effect transistor (FET) 16 wired across photodiode 12. The FET 16 uses a single 15 volt D.C. supply with $R_D$ in series in the D.C. loop. The drain to source voltage across FET 16 is taken between capacitor 13 and the sliding contact of source resistor 17. The FET 16 performs a function of impedance conversion by transforming all impedances and currents on one side with respect to the impedances and currents on the other side. Thus, the FET output signal is the same 1.0 KHz input signal from photodiode 12. The 1.0 KHz output signal from FET 16 is fed via the sliding contact of resistor 17 to the A.C. coupling capacitor 18 of the tuned amplifier circuit 20.

TUNED AMPLIFIER CIRCUIT

Still referring to FIG. 8*a*, there is illustrated a typical tuned amplifier circuit generally designated at 20. The tuned amplifier circuit 20, which includes the operational amplifier 21, functions as a band-pass filter. The tuned amplifier 20 operated in a linear mode typically has a bandwidth, as defined by the frequency range between the −3dB points of its gain versus frequency characteristics, of about 80 Hz – 100 Hz. Ideally, its center frequency is selected at about 1.0 KHz to filter out any noise associated with the chopper 40, as well as other extraneous noise, such as may be caused by normal flunctuations in the voltage level of the power mains.

The operational amplifier 21 functions, essentially, to increase the amplitude of the 1.0 KHz A.C. signal coupled into the coupling capacitor 17. As will be recalled, the peak-to-peak amplitude of the input signal depends upon the imbalance of the lamp intensity end-to-end. The amplifier 21 is intended to amplify only the narrow bandwidth of 1.0 KHz frequencies. Feedback is provided through the bridged-T-network comprising the high-pass capacitor 27 and the low-pass loop resistors 28 and 29. Biasing is provided by the resistor 9 and resistor 19 functions as a drift stabilizing resistor. The output signal from amplifier 21 is coupled into the phase-splitter circuit 22.

PHASE-SPLITTER CIRCUIT

The phase-splitter circuit splits the amplifier signal from the amplifier 21 into two signals, equal in amplitude and separated in phase by 180°. One typical circuit to accomplish this function is shown in FIG. 8*a*.

The phase-splitter circuit 22 is essentially two R-C coupled transistor amplifier stages. The output of transistor 23 amplifier stage is coupled via the capacitor 29 into the input of transistor 24 amplifier stage. The gain for both stages may be unity. Since the output of transistor 24 is 180° out of phase with respect to the input in the normal operating frequency range, the input to transistor 24 is 180° out of phase with the input into transistor 23. Hence, their outputs are likewise displaced.

The constant current regulator 30 is designed to maintain a fixed current through the output load resistor 31. The transistor 32 emitter current level is fixed by the zener diode 33. If the tap on the output load resistor 31 is adjusted correctly, just enough voltage is applied to cause the output of transistor 24 to be equal in amplitude to that of transistor 23. Thus, the output signal produced from the phase-splitter circuit 22 are two A.C. sinusoidal signals, phase 1 ($\phi_1$) and phase 2 ($\phi_2$) both at the 1.0 KHz input frequency. The peak-to-peak amplitude of the output signals $\phi_1$ and $\phi_2$ is proportional to the imbalance of the intensity of the lamp 2 from one end to the other. If there is no imbalance, then the 1.0 KHz *a–c* signals ($\phi_1$ and $\phi_2$) will have zero amplitude.

The two A.C. output signals $\phi_1$ and $\phi_2$ produced from the transistors 23 and 24 are coupled into the phase amplitude detector circuit 50 via leads 25 anad 26 from the transistors 23 and 24 respectively. The lead 25 is used to couple the 1.0 KHz *a–c* sinusoidal signal $\phi_1$ from the transistor 23 into the phase amplitude detector circuit 50. The lead 26 is used to couple the 1.0 KHz *a–c* sinusoidal signal $\phi_2$ from the transistor 24 into the phase amplitude detector circuit 50. The phase amplitude detector 50 will be described in detail hereinafter.

The 1.0 KHz signal from the light chopper 40 that is used to drive the chopper vanes may also be used as a reference signal.

AMPLIFIER-REFERENCE CIRCUIT

Figure 8B:
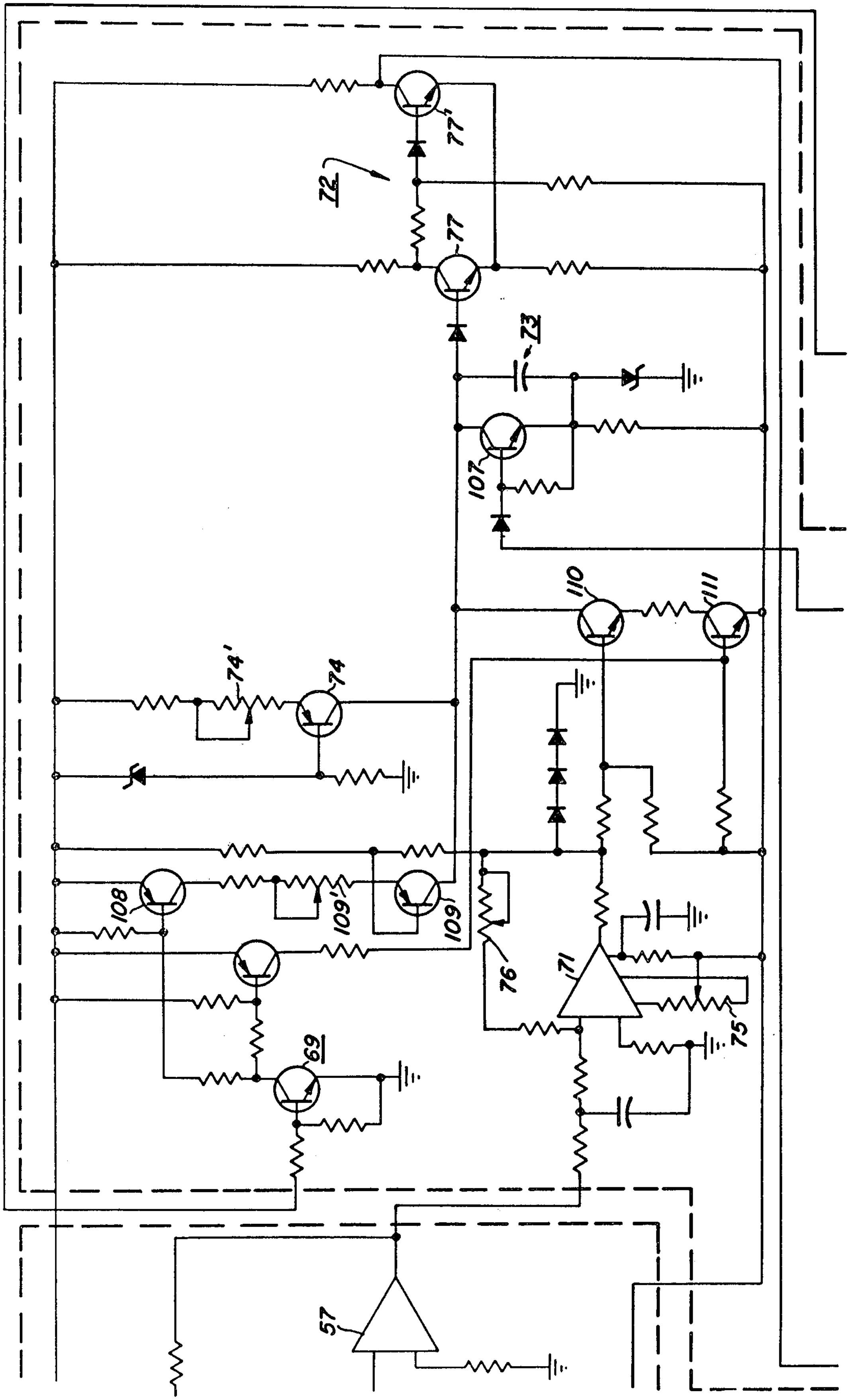
Figure 8C:
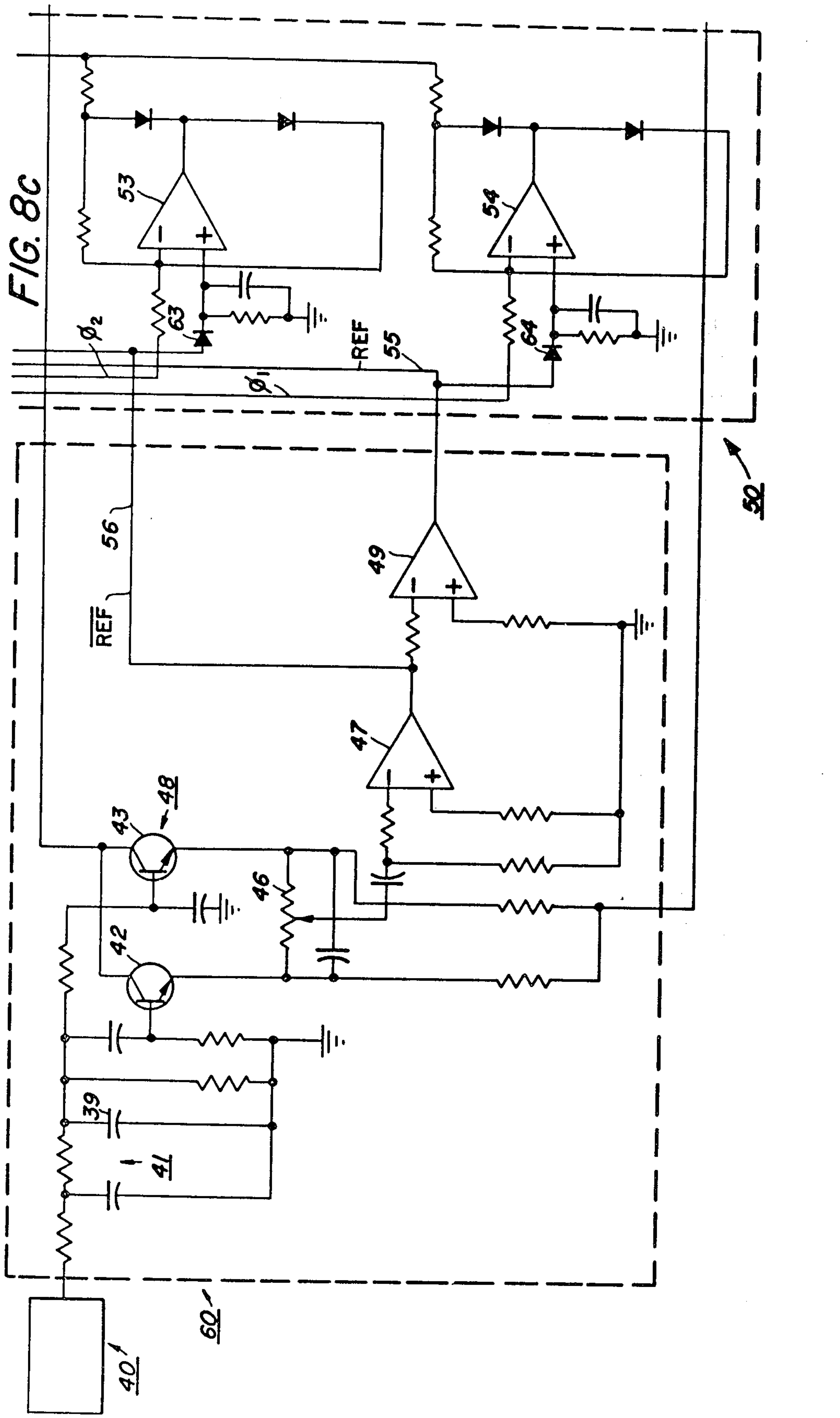

FIG. 8*c* shows a typical circuit arrangement of the amplifier-reference circuit 60. The amplifier-reference circuit includes the filter 41, converter 48, squaring circuit 47 and invertering circuit 49.

The signal from the chopper 40 is essentially a square wave when it comes out of the chopper driver. The 1.0 KHz chopper driver signal from light chopper 40 is coupled into the $\pi$ section filter circuit 41 which is intended to pass only the fundamental component of the 1.0 KHz signal and produce attenuation for all frequencies. After the chopper driver signal has been filtered, it is coupled into the converter circuit 48.

The converter circuit 48 is used to convert the square wave signal from the light chopper 40 to a sine wave. The filtered square wave signal from the light chopper 40 is coupled via capacitor 39 into the transistor 42 input. Transistor 42 sinusoidal output signal is intended to provide a 45° lead relationship with respect to the input square wave signal. The filtered square wave signal is also connected to the base of transistor 43. Transistor 43 sinusoidal output signal is intended to provide a 45° lag relationship with respect to the input signal. Thus, there is a 90° phase difference at the common output from the transistors 42 and 43. This output signal from the converter circuit 48 may then be shifted slightly by the variable resistor 46 to get it in phase with the fundamental alternating component of the output signal from the photodiode 12.

After the output signal from the converter circuit 44 has been shifted, it is fed via the sliding contact of the variable resistor 46 into a squaring circuit 47. The squaring circuit 47 output signal is coupled into the inverter circuit 49 which is used to develop the square wave output reference signal REF that is in phase with the input signal from the converter circuit 48. Since the inverter circuit 49 input signal is 180° out of phase with an input signal into squaring circuit 47, there is a similar displacement of the outputs. Thus, squaring circuit 47 output signal is the square wave signal $\overline{\text{REF}}$ which is the same amplitude as REF but 180° out of phase (see FIG. 3).

PHASE AMPLITUDE DETECTOR

Figure 2:
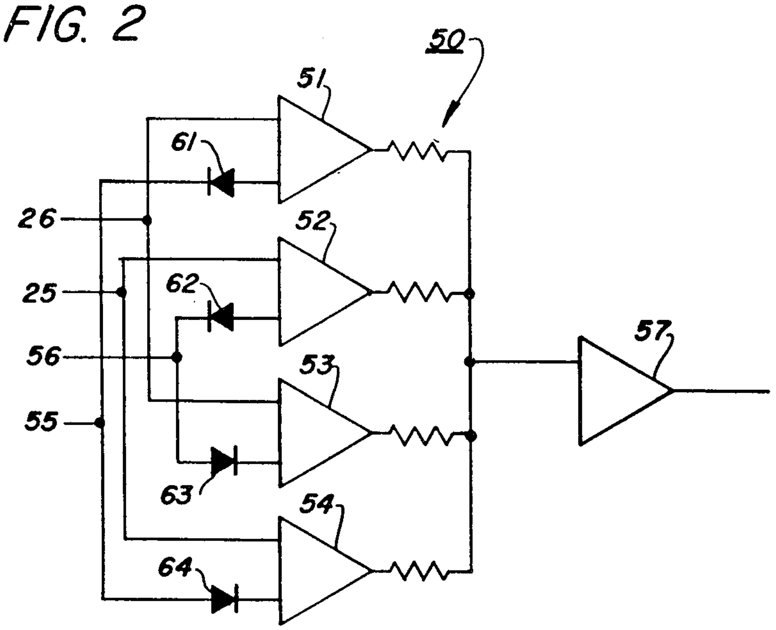
FIG. 2 is a simplified schematic circuit diagram of the phase amplitude detector portion of the lamp control circuit.
Figure 7:
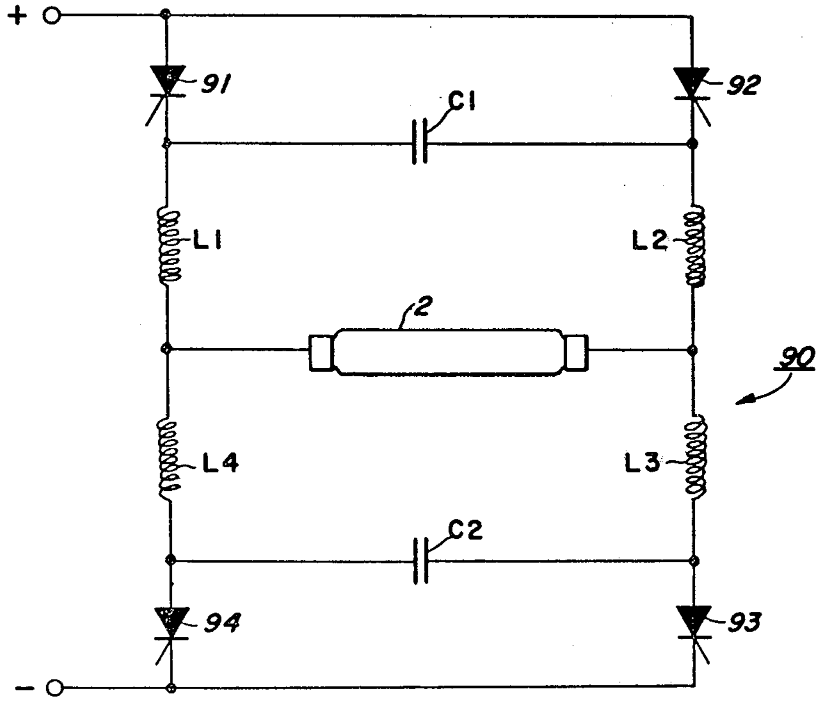
FIG. 7 is a simplified schematic circuit diagram of the lamp switch.

In FIGS. 8*a–c* is shown the circuit arrangement of the phase amplitude detector circuit 50. A simplified schematic diagram of the phase amplitude detector circuit 50 is illustrated in FIG. 2. The phase amplitude detector circuit 50 may be used to produce a signal indicative of which end of the lamp 2 is the brighter The output signal from the phase amplitude detector circuit 50 is either a positive or negative D.C. signal depending upon whether the left or giht end of the lamp 2 is brighter. For example, if the output D.C. signal is positive, this means that the left end of the lamp is brighter whereas a negative D.C. output signal means that the right end of the lamp is brighter.

The two reference square wave signals REF and $\overline{\text{REF}}$ produced by the reference circuit 60 may be used to control the operation of the phase amplitude detector circuit 50. The phase amplitude detector circuit includes four linear amplifiers 51, 52, 53 and 54 arranged in such a manner that the output will provide the phase and amplitude demodulation of the signals $\phi_1$ and and $\phi_2$. The reference signals REF and $\overline{\text{REF}}$ are only used to turn these four linear amplifiers "on" and "off". The signals REF and $\overline{\text{REF}}$ enable and disable the linear operation of the four linear amplifiers.

The four amplifiers 51, 52, 53 and 54 are each connected with gating diodes 61, 62, 63 and 64 respectively.

The two reference signals control the operation of the phase amplitude detector circuit by gating the four linear amplifiers "on" and "off".

The reference signal REF is applied via lead 55 into the gating diodes 61 and 64 of amplifiers 51 and 54 respectively. The amplifier 51 can only put out a positive signal that is a result of a negative going $\phi_2$ input. The REF input signal to amplifier 51 is coupled through gating diode 61 which permits amplifier 51 to linearly amplify the signal on line 26 ($\phi_2$) during the negative half cycles of $\phi_2$ when REF is concurrently positive. When REF is negative, however, amplifier 51 is disablied from linear operation regardless of the $\phi_2$ signal.

The amplifier 54 can only put out a negative signal that is the result of a positive going $\phi_1$ input. The REF input signal to amplifier 54 is coupled via lead 55 through gating diode 64 which permits amplifier 54 to linearly amplify the signal on line 25 ($\phi_1$) during the positive half cycles of $\phi_1$ when REF is concurrently negative. When REF is positive, however, amplifier 54 is disabled from linear operation regardless of the $\phi_1$ signal.

The reference signal $\overline{REF}$ is applied via lead 56 into the gating diodes 62 and 63 of amplifiers 52 and 53 respectively. The amplifier 52 can only put out a positive signal that is the result of a negative going $\phi_1$ input. The $\overline{REF}$ input signal to amplifier 52 is coupled through gating diode 62 which permits amplifier 52 to linearly amplify the signal on line 25 ($\phi_1$) during the negative half cycles of $\phi_1$ when $\overline{REF}$ is concurrently positive. Where $\overline{REF}$ is negative, amplifier 52 is disabled from linear operation, regardless of the $\phi_1$ signal.

The amplifier 53 can only put out a negative signal that is the result of a positive $\phi_2$ input. The $\overline{REF}$ input signal to amplifier 53 is coupled via lead 56 through gating diode 63 which permits amplifier 53 to linearly amplify the signal on line 26 ($\phi_2$) during the positive half cycles of $\phi_2$ when $\overline{REF}$ is concurrently negative. When $\overline{REF}$ is positive, however, amplifier 53 is disabled from linear operation regardless of the $\phi_2$ signal.

The four amplifiers 51, 52, 53 and 54 arranged in the manner described above form an amplifier gating system, two amplifiers are "on" and two are "off" at any given instant in time depending upon the REF and $\overline{REF}$ signals. Amplifiers 53 and 54 are capable of negative outputs only and amplifiers 51 and 52 are capable of positive outputs only. These amplifiers whose associating circuit arrangement for each is identical, lose nothing at the output terminal for the other polarity and there is no substantial diode drop across the output diode because the gain of the amplifier is used to essentially divide the drop across the diode by the gain of the amplifier. The output diodes are connected so that the output of the amplifier is not connected directly to the output terminal of the amplifier. Instead, the output is connected to a diode which is in series with the output of the amplifier and the feedback resistor of the amplifier.

So long as there are 1.0 KHz REF and $\overline{REF}$ signals into phase amplitude detector circuit 50, there will always be two amplifiers that are capable of producing either a positive or negative D.C. output signal. The polarity of the D.C. output signal, positive or negative, depends on whether $\phi_1$ or $\phi_2$ is in phase with the 1.0 KHz REF signal.

Figures 3, 4:
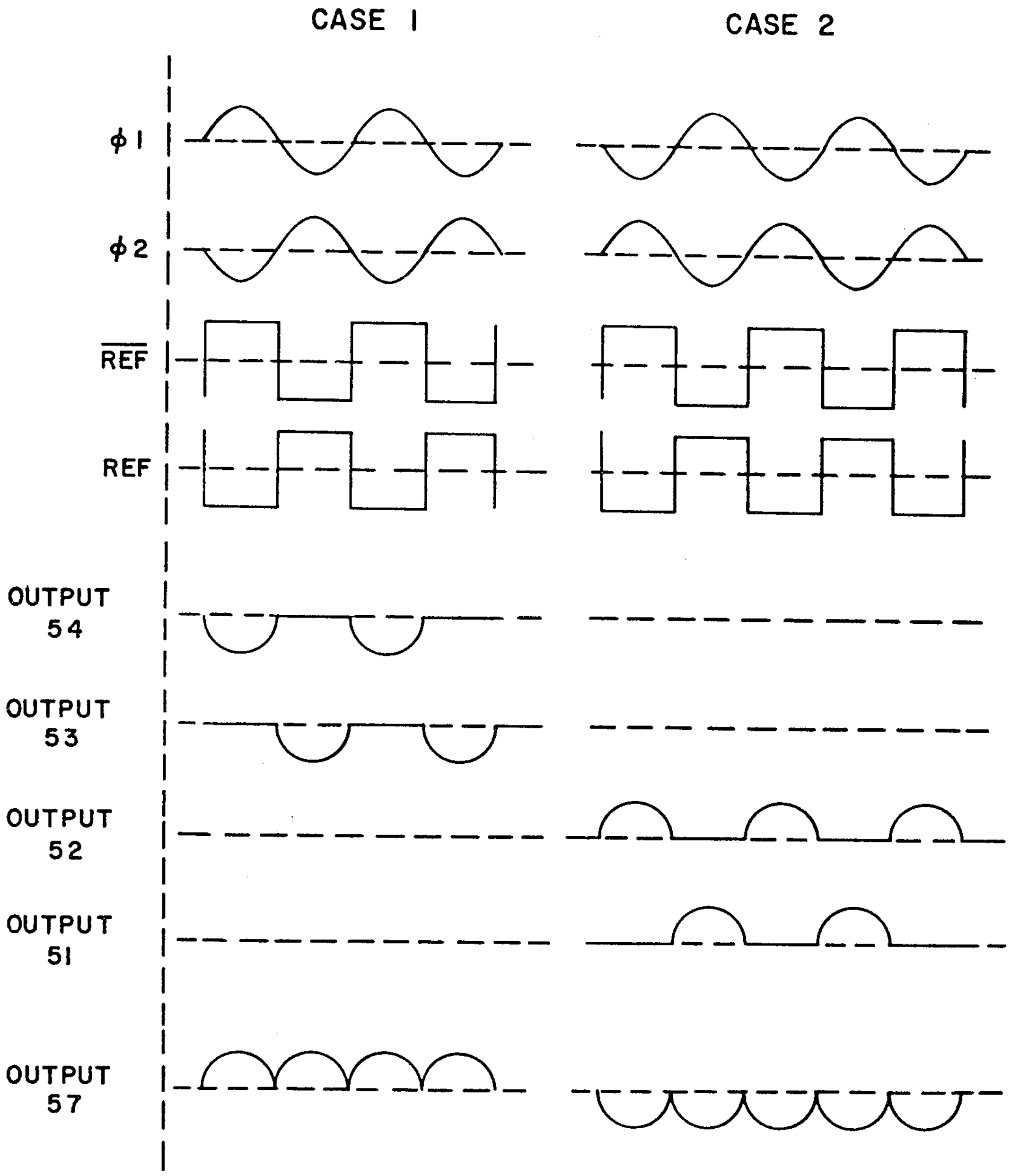
FIGS. 3 and 4 are waveform graphs of the time, phase and polarity relations of input and output signals of the phase amplitude detector circuit.

Referring now to FIGS. 3 and 4, there is shown graphs of the time, phase and polarity relations of input and output signals of the phase amplitude detector circuit 50.

From the four linear amplifiers 51, 52, 53 and 54 with their particular outputs, four signals 51 out, 52 out, 53 out and 54 out, respectively, are derived. These four signals, added linearly in the operational amplifier 57, give either a full wave rectified positive signal out (illustrated as Case 1 in FIG. 3) or a full wave rectified negative signal out (illustrated in Case 2 in FIG. 4). The peak amplitude of this varying D.C. signal is proportional to the imbalance of the lamp end-to-end and the polarity indicates the direction of any such imbalance. For example, Case 1 output from amplifier 57 means the left end is brighter. Case 2 output means that the right end of the lamp 2 is brighter. To correct for any such imbalance, this D.C. signal is converted into a time variable dwell difference. Thus, if the balance of the lamp 2 is varying as a function of time, the polarity time dwell of the driving voltage for the lamp is varied in synchronism therewith.

TIME BASE GENERATOR CIRCUIT

More particularly, the D.C. signal from the phase amplitude detector circuit 50 is used to control the period between alternate pairs of pulses, time period "V", in a pulse chain in the time base generator 70. The period between the other alternate pairs of pulses in the chain, time period *f*, is fixed.

Figure 5:
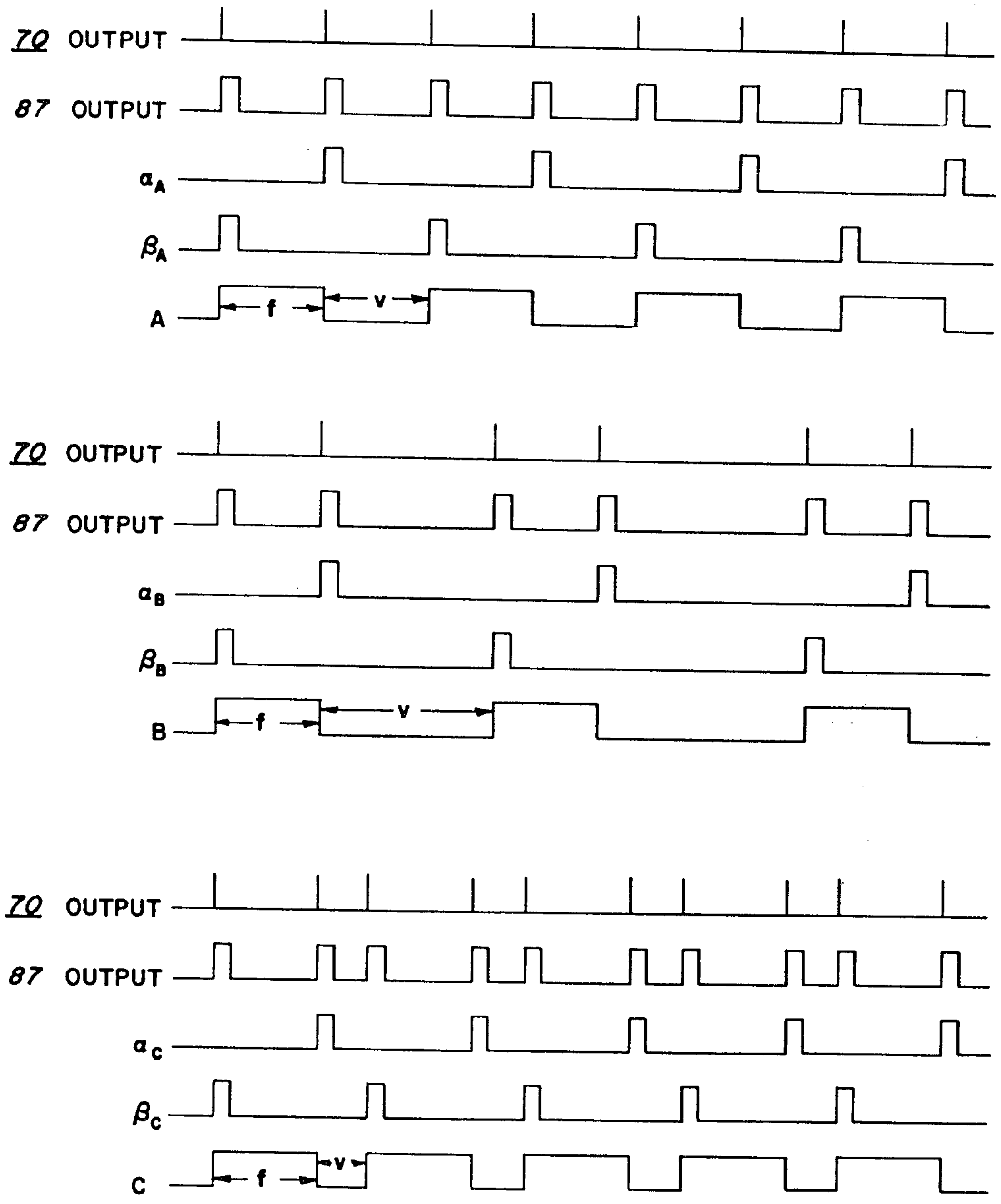
FIG. 5 is a waveform graph of the time base generator output and the lamp polarity dwell time relations.
Figure 6:
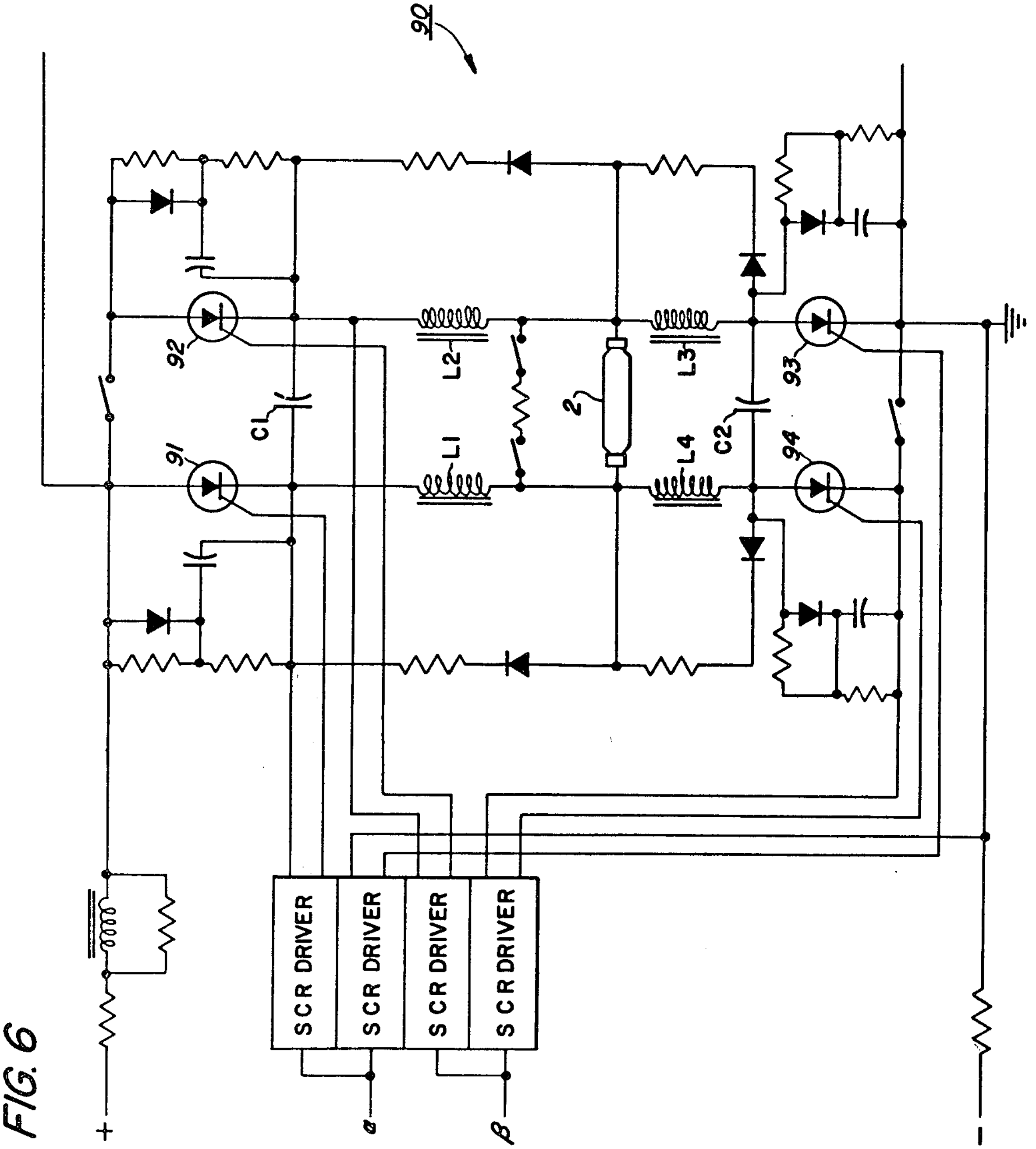
FIG. 6 is a schematic circuit diagram of the lamp switch according to this invention.

FIGS. **8*b* and 8*d* show a typical arrangement of the time base generator circuit. FIG. 1a shows a simplified circuit of the time base generator circuit 70. FIG. 5 illustrates the time base generator circuit 70 output pulse chain and the lamp polarity dwell time relationships. The time variance of the variable half period, "V", is proportional to the D.C. end-to-end balance signal. A illustrates the condition where the lamp 2 intensity is balanced end-to-end ($V=f$), B shows the output wave where the right end of the lamp 2 is brighter ($V > f$) and C illustrates the condition where the left end of lamp 2 is brighter ($V < f$). The 87 output wave shown in FIG. 5** represents regenerated timing pulses to be described hereinafter.

The output signal from amplifier 57 is coupled to the input of the amplifier 71. The time base generator 70 is designed such that for an input into amplifier 71 other than zero, the time spacing of the chain of pulses will change such that two consecutive pulses will be separated by time *f* and the next succeeding pulse will follow after time period "V" and the next pulse time period *f*, and etc. The time period "V" will be controlled by the amplitude and polarity of the finite input signal into amplifier 71.

SCHMITT TRIGGER CIRCUIT

FIG. **8*b* shows a typical arrangement for the Schmitt trigger circuit 72. The Schmitt trigger circuit 72 functions as a zero volt level detector. The Schmitt trigger circuit 72 includes transistors 77 and 77'. When the input to transistor 77 is increased sufficiently, for example, from −3.6 volts to zero, the base-to-emitter voltage is large enough to permit a trigger pulse from the Schmitt trigger circuit 72**.

The trigger pulse from the Schmitt trigger circuit 72 is supplied to the input of the monostable multi-vibrator (one-shot) 68. The one-shot 68 develops a trigger pulse of about 2 microseconds in pulse width. This 2 microsecond trigger pulse is coupled to the inverter 81 in the lamp switching logic circuit 80.

LAMP SWITCHING LOGIC

Figure 8D:
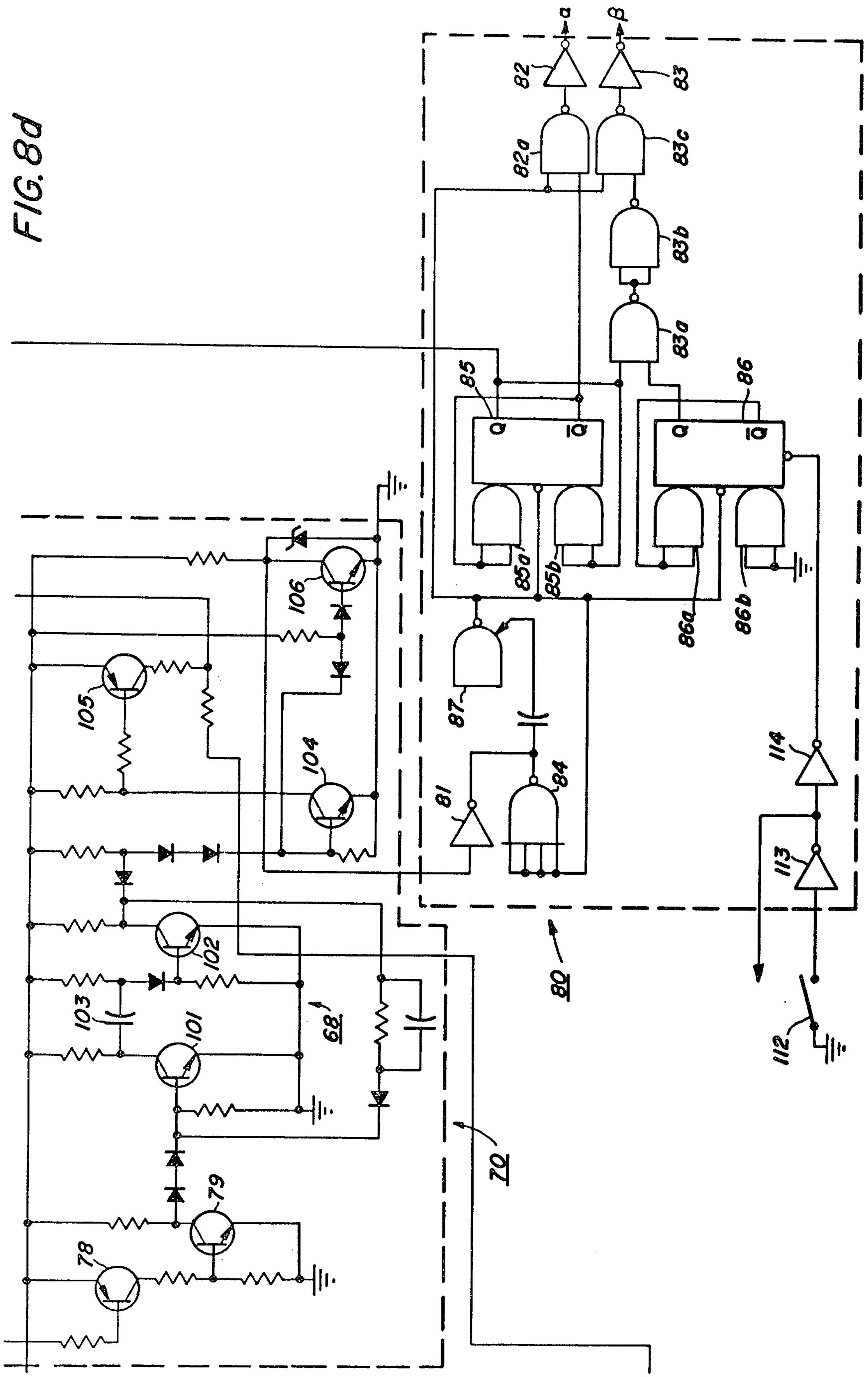

Referring now to FIG. 8*d*, the lamp switching logic circuit 80 is illustrated in logical symbols rather than the conventional schematic circuit diagram for purposes of clearity. THe lamp switching logic circuit 80 is used to convert the chain of pulses from the time base generator 70 to two pulse chains, Alpha ($\alpha$) and Beta ($\beta$). These two pulse chains ($\alpha$ and $\beta$) are employed to control the operation of two pairs of silicon controlled rectifiers (SCR's) in the lamp switch circuit 90 by triggering the SCR's "on" and "off". The lamp switch circuit 90 will be described more particularly hereinafter.

The lamp switching logic circuit 80 includes the inverter 81 and the AND gates 84 and 87. The inverter 81 and gates 84 and 87 function to convert the chain of pulses from the time base generator 70 to regenerated timing chain of pulses having identical spacing. The widths of these regenerated timing chain of pulses (see FIG. 5) are suitable for firing the silicon controlled rectifiers (SCR's) in the lamp switch circuit 90, which will be described in particularity hereinafter. The AND gate 87 provides a one-shot trigger pulse of about 10 microseconds in width. The 10 microsecond trigger pulse is applied to the input terminals of the flip-flops 85 and 86. The flip-flops 85 and 86 and the steering gates 85*a–d*, 86*a–b*, 82*a* and 83*a–c* associated with their outputs produce the two pulse chains, $\alpha$ and $\beta$ referred to hereinearlier. The pulse chain may be used to gate or fire the odd numbered SCR's 91 and 93 in the lamp switch circuit 90. The $\beta$ pulse chain may be used to gate or fire the even numbered SCR's 92 and 94 in the lamp switch circuit 90.

It will be appreciated that the flip-flop 85 changes its state with each input pulse from the time base generator 70. For example, the Q and $\overline{Q}$ outputs of flip-flop 85 alternately steer the reproduced timing chain either to the inverter 82 or to the inverter 83. The output produced from inverter 82 is the pulse chain and the output of inverter 83 is the $\beta$ pulse chain. When the flip-flop 85 output Q is high (the "one" state) the regenerated input timing chain is steered to inverter 83. When this condition occurs, simultaneously the connection from flip-flop 85 output Q to the base of the transistor 69 in the time base generator 70 (FIG. 8*b*) allows the output signal from the amplifier 71 to influence the current flow in the timing capacitor 73 to set the variable time, V, to the next timing chain pulse which will appear in the $\beta$ pulse chain. The relationships between the output pulse chain from the time base generator 70, the regenerated pulse chain and the $\alpha$ and $\beta$ pulse chains are shown graphically in FIG. 5.

The flip-flop 86 may be used to inhibit the $\alpha$ pulse chain by the selector switch 112 until the lamp 2 is ignited. Once the lamp 2 has been ignited and requires switching, flip-flop 86 is utilized to initiate that switching after an pulse. In such case, the switch 112 is moved from non-inhibit inverter 114 to the inhibit inverter 113.

The chain of pulses generated in the time base generator 70 describes the the polarity time dwell. The lamp 2 always has, for example, the left side positive and the right side negative for 5 milliseconds. But the left side negative and right side positive polarity, applied to the lamp 2, how long it dwells there is proportional to the D.C. signal out of the phase amplitude detector 50 and whether it is longer or shorter than 5 milliseconds depends upon the polarity of that D.C. signal. Thus, the lamp intensity is constantly observed and, if the left end is brighter than the right end ($V < f$), that means the polarity need to dwell a shorter amount of time in left end negative, right end positive case. Conversely, if the right end is brighter than the left end ($V > f$), that means the polarity needs to dwell a greater amount of time in left end negative, right end positive case.

The instant the lamp 2 has started conducting, the process of cathaphoretic migration beings. The metal halide materials within the lamp tends to selectively migrate to one end of the lamp with resultant end-to-end imbalance in light output. In connection with photoelectrophoretic opaque imaging, and other photographic systems that require exposure with artifical light, the process should not "see" an imbalance end-to-end of the light from the lamp as a result of cathophoresis.

Another factor that tends to have an effect on the spectral output of long multi-vapor arc lamps is variations in temperature along the length of the lamp. As the operating temperature increases, there is a resultant shift in spectral output. In order to reduce these characteristics of long multivapor lamps and optimize results for exposure with artifical light, the lamp switching logic circuit 80 and lamp switch circuit 90 of this invention is provided.

Figure 10:
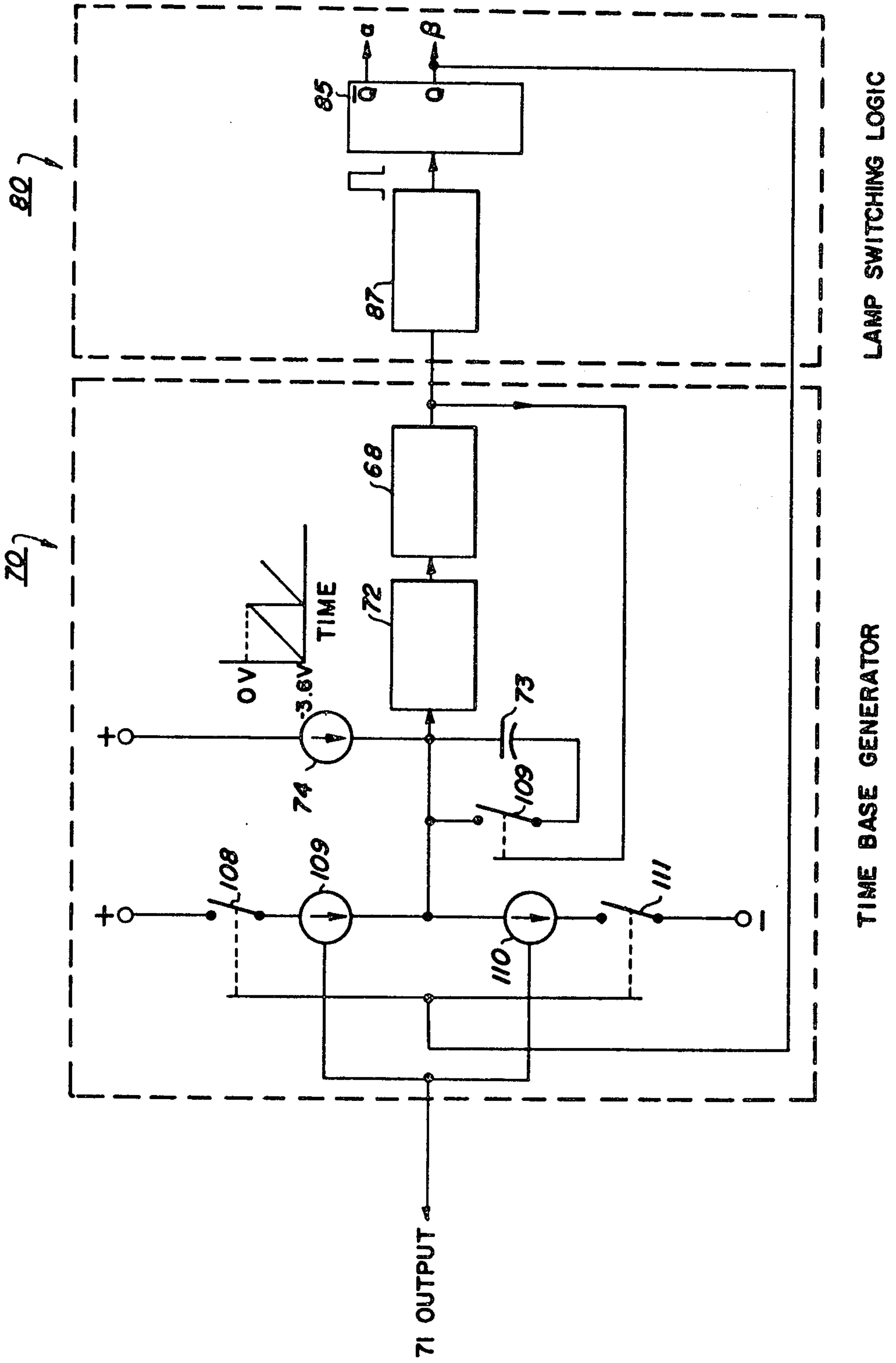
FIG. 10 shows a simplified diagram of the time base generator and lamp switching logic circuits.

FIG. 10 is a simplified diagram of the time base generator 70 and lamp switching logic circuit 80 which, in conjunction with the other Figures, may be useful to illustrate the operation of the time base generator and the lamp switching logic circuits.

As recalled earlier, Case 1 positive output from amplifier 57 in the phase amplitude detector 50 indicates that the left end of lamp 2 is brighter and $V < f$. In such case, the output from the amplifier 71 will be negative, increasing the current from the current generator 109 and decreasing the current down in current generator 110. The constant current generator 74 is not changed, thereby, resulting in a net increase in the current supply to charging capacitor 73, thus, charging capacitor 73 faster and shortening V. Conversely, when Case 2 output from amplifier 57 is negative, this indicates that the right end of lamp 2 is brighter and $V > f$. The output from amplifier 71 will be positive, decreasing the current from current generator 109 and increasing the current from current generator 110. The constant current generator 74 is not changed thereby, resulting in a net decrease in the current supply to charging capacitor 73, thus charging capacitor 73 at a slower rate and lengthening V.

The variable resistor 75 may be adjusted so that whenever the input into amplifier 71 is zero volts the output will also be zero volts. In such case, the current flow through 108–109 is equal to the current flow through 110–111. **Thus, the system is balanced so that there is a fixed time interval for V and *f* that is equal under the zero volt condition. When there is an input into amplifier 71 other than zero volts, V will vary in proportion to that input signal. The gain resistor 76** may be adjusted to determine how much V varys in proportion to the nonzero volt input condition.

LAMP SWITCH

The lamp switch circuit 90 is used to minimize the effect of cathophoresis by reversing the polarity of current flow through the lamp, and to minimize the transistion interval between the time that there is full current flow on in one direction and that time that there is full current flow in the opposite direction. The lamp switch circuit 90 utilizes SCR's in place of conventional mechanical switches and relays so as to provide a high voltage device that is capable of some abuse in the switching.

The use of SCR's in a bridge arrangement across a load is generally known. For example, SCR Manual, Fifth Edition, by General Electric suggests such a configuration at 13.1.3, Inverter Configurations, page 353. However, the triggering and commutation methods of this invention used to reverse the direction of current flow through long multi-vapor arc lamps is of no concern in the discussion therein.

The lamp switch circuit 90 includes four SCR's connected in an SCR bridge configuration. The SCR rectifier bridge has four SCR's 91, 92, 93 and 94 arranged in pairs such that only one pair of SCR's is turned "on" at any instant of time. Either the odd numbered pair (91, 93) or the even numbered pair (92, 94) are turned "on" at any instant. When the odd pair, 91 and 93, is turned "on", current flow through the lamp 2 is in one direction and if the even pair of SCR's, 92 and 94, is turned "on", current flows in the opposite direction through the lamp 2. The output signal $\alpha$ from 82 of the lamp switching logic circuit 80 is coupled into the gates of SCR's 91 and 93 to trigger these SCR's on. The output signal $\beta$ from 83 of the lamp switching logic circuit 80 is coupled into the gates of SCR's 92 and 94 to trigger these SCR's on.

A problem encountered in earlier transistor systems is the problem of getting more than two transistors in a bridge turned on at the same time. To prevent this, in the SCR bridge, there are two capacitors, C1 and C2, called "commutating" capacitors, utilized in the lamp switch circuit 90. With a current path through a pair of SCR's, odd or even, turned on in the normal manner, the commutating capacitors C1 and C2 will charge up to what ever voltage is across the lamp 2 at a particular polarity. Left to right, the two commutating capacitors C1 and C2 are always charged the same way. Very quickly after capacitors C1 and C2 are charged up, C1 has the negative charged end at the cathode of a non-conducting SCR and its positive end is at the cathode of a conducting SCR. C2 has the negative end at the anode of the other conducting SCR and its positive end is at the anode of the other non-conducting SCR. If you now take and turn on the other pair of SCR's, the capacitors C1 and C2 are charged up in such a manner as to help the desired SCR's turn "on" rapidly. This pair of SCR's has a very large supply of current potential available to their cathode and anode in the right direction. Thus, they can turn "on" very quickly. A feature of the lamp switch circuit 90 is that when you turn "on" a SCR that is just gating, it instantly connects charged up capacitor, C1 or C2, through itself across the SCR that was turned "on" and is desired to be turned "off". What ever the value of lamp voltage was is applied as reverse bias to the SCR that was turned "on" and is desired to be turned "off". The current in an SCR and the circuit associated with it (resistor, diode) is reversed or blocked in the system in a few nanoseconds.

When the second pair of SCR's is turned "on" the charged commutating capacitors C1 and C2 are connected in reverse polarity across the previously conducting pair of SCR's. When this occurs, there is the possibility of an instant short through to be produced straight across the right side of the SCR bridge or across the left side of the SCR bridge or across both. If you turn one pair of SCR's "on" and the other pair of SCR's "off", the first pair is simply trying to pump more current, and suddenly provides a very high current path. To prevent a short circuit from happening, the four inductors, L1, L2, L3 and L4, are inserted into the lamp switch circuit. These four inductors or coils are inserted in the lamp switch circuit 90 strictly to prevent a high current flow from starting quickly. On each side of the SCR bridge, one inductor has current flow through it initially and the other inductor has no current flow. The inductors that have no current flow through it when you initially fire an SCR pair is the inductors that are really holding things off and thereby avoiding a short circuit. Once the previously conducting SCR pair is turned "off", which happens in a few nanoseconds, (but if it occurs in microseconds it would still be all right), current may now build up to some reasonable value in the previously non-conducting coil because they happen to be the ones that will be conducting lamp current next anyway. Once the predetermined SCR' s are shut "off", the surplus energy in the capacitors C1 and C2 is discharged through the lamp 2. As soon as the charges drop to zero in the discharging commutating capacitors, C1 and C2, they immediately start to charge in the opposite direction, therefore, getting ready for the next polarity reversal. By the time capacitors C1 and C2 are charged completely, or very near completely, the lamp 2 is now conducting in the new or opposite polarity from what it was conducting.

In the preferred embodiment of the lamp switch circuit 90, all inductors are of the same inductance (L=L1=L2=L3=L4), and the capacitors are of the same capacitance (C=C1=C2), and the lamp looks approximately resistive, $R_L$. For example, the the inductance L for each of L1, L2, L3 and L4 is ≈ 50 $\mu$H. Likewise, the capacitance C for each of C1, C2, C3 and C4 is 0.1 $\mu f$.

It is also appreciated that after an SCR pair is turned "on", current continues to flow in the lamp 2 for a delay period, $\tau_D$ where:

$$\tau_D \approx R_L C$$

After this delay period $\tau_D$, a rise time $\tau_R$ for current flow in the reverse direction in the lamp 2 is encountered, where:

$$\tau_R \approx 4L/R_l$$

Other modifications to the above described invention will be apparent to those skilled in the art and are intended to be incorporated herein.

What is claimed is:

1. A lamp control circuit for maintaining balance of light intensity output of long multi-vapor arc lamps comprising:
   a. a long multi-vapor arc lamp mounted for exposure;
   b. light chopper means for exposing a light sensitive element to light intensity output from opposite ends of said lamp at a constant frequency, said light chopper means comprises chopper driver means for driving said light chopper means to thereby expose said light sensitive element at said constant frequency and providing a reference signal for reference signal means;
   c. means for detecting said light sensitive element output signals to thereby provide an output signal proportional to light intensity imbalance end-to-end of said lamp;

d. tuned amplifier means for amplifying said imbalance signal between a narrow bandwidth near said constant frequency;

e. phase converter means for converting said imbalance signal into two signals $\phi_1$ and $\phi_2$ of equal amplitude separated in phase by 180°, said signals $\phi_1$ and $\phi_2$ amplitude is proportional to said imbalance signal;

f. said reference signal means in (b) above comprising (i) filter means for filtering said reference signal (ii) phase-splitter means for splitting said reference signal and thereby making available two signals of equal amplitude separated in phase by 180°

(iii) squaring and inverter means for squaring said reference signals from said phase-splitter to provide a squared signal REF means and developing another squared signal $\overline{\text{REF}}$ of the same amplitude as said squared signal REF but separated in phase by 180° and h. phase amplitude detector means for providing an output signal indicative of which end of said lamp is brighter, said phase amplitude detector output signal results from said imbalance signals $\phi_1$ and $\phi_2$ and is controlled by said squared reference signals REF and $\overline{\text{REF}}$.

2. Apparatus according to claim 1 wherein said light chopper means further comprises:

a. light pipes positioned at opposite ends of said lamp to feed light intensity from opposite ends of said lamp to said light sensitive element; and b. chopper vanes driven by said chopper driver means to alternately expose said light sensitive element to light intensity output from opposite ends of said lamp through said light pipes at said constant frequency.

3. Apparatus according to claim 2 wherein said light chopper provides a reference signal at the same frequency as said chopper vanes.

4. Apparatus according to claim 3 wherein said light chopper means expose said light sensitive element at a constant frequency of 1.0 KHz.

5. Apparatus according to claim 4 wherein said chopper vanes are driven by said chopper driver means at a constant frequency of 1.0 KHz.

6. Apparatus according to claim 5 wherein said light sensitive element is a photodiode detector whose output signal is a D.C. signal plus an alternating signal at a constant frequency of 1.0 KHz.

7. Apparatus according to claim 6 wherein said tuned amplifier means has a center frequency of about 1.0 KHz.

8. Apparatus according to claim 6 wherein said phase amplitude detector output signal peak-to-peak amplitude is proportional to light intensity imbalance of said lamp end-to-end.

9. Apparatus according to claim 8 wherein said phase amplitude detector output signal polarity indicates which end of said lamp is brighter.

10. Apparatus according to claim 1 wherein said phase amplitude detector means further comprises amplifier gating means for providing either a positive or negative D.C. output signal depending upon whether the left or right end of said lamp is brighter.

11. Apparatus according to claim 10 wherein said amplifier gating means comprises:

a. a first pair of linear amplifiers, one of said first pair of linear amplifiers is capable of a positive D.C. output signal only whereas the other linear amplifier of said first pair of linear amplifiers is capable of a negative D.C. output signal only;

b. a second pair of linear amplifiers, one of said second pair of linear amplifiers is capable of a positive D.C. output signal only whereas the other linear amplifier of said second pair of linear amplifiers is capable of a negative D.C. output signal only.

12. Apparatus according to claim 11 wherein one of said first pair of linear amplifiers puts out a positive D.C. signal as a result of a negative going $\phi_2$ input signal when said REF input signal is concurrently positive.

13. Apparatus according to claim 12 wherein one of said first pair of linear amplifiers is disabled from linear operation when said REF input signal is negative regardless as to said $\phi_2$ input signal.

14. Apparatus according to claim 13 wherein said other linear amplifier of said first pair of linear amplifiers puts out a negative D.C. signal as a result of a positive going $\phi_1$ input signal when said REF input signal is concurrently negative.

15. Apparatus according to claim 14 wherein said other linear amplifier of said first pair of linear amplifiers is disabled from linear operation when said REF input signal is positive regardless as to said $\phi_1$ input signal.

16. Apparatus according to claim 14 wherein one of said second pair of linear amplifiers puts out a positive D.C. signal as a result of a negative going $\phi_1$ input signal when said $\overline{\text{REF}}$ input signal is concurrently positive.

17. Apparatus according to claim 16 wherein one of said second pair of linear amplifiers is disabled from linear operation when said $\overline{\text{REF}}$ input signal is negative regardless as to said $\phi_1$ input signal.

18. Apparatus according to claim 17 wherein said other linear amplifier of said second pair of linear amplifiers puts out a negative D.C. signal as a result of a positive going $\phi_2$ input signal when said $\overline{\text{REF}}$ input signal is concurrently negative.

19. Apparatus according to claim 18 wherein said other linear amplifier of said second pair of linear amplifiers is disabled from linear operation when said $\overline{\text{REF}}$ input signal is positive regardless as to said $\phi_2$ input signal.

20. Apparatus according to claim 19 wherein said D.C. output signals are full wave rectified whose peak amplitude is proportional to the imbalance of light intensity of said lamp end-to-end and polarity indicates the direction of imbalance of said lamp light intensity end-to-end.

21. Apparatus according to claim 20 wherein a full wave rectified positive D.C. output signal from said amplifier gating means indicate that the left end of said lamp is brighter.

22. Apparatus according to claim 21 wherein a full wave rectified negative D.C. output signal from said amplifier gating means indicate that the right end of said lamp is brighter.

23. Apparatus according to claim 20 wherein said D.C. output signals from said amplifier gating means are used to control a variable period between alternate pairs of pulses in a pulse chain in time base generator means.

24. Apparatus according to claim 23 wherein the variance of said variable period between alternate pairs of pulses is proportional to said amplifier gating means light intensity D.C. balance signal end-to-end of said lamp.

25. Apparatus according to claim 24 wherein said time base generator means further comprises zero volt level detector means for supplying a trigger pulse to monostable multivibrator means for generating a pulse for controlling a fixed period between alternate pairs of pulses in said pulse chain to thereby provide a chain of pulses of alternating fixed and variable periods.

26. Apparatus according to claim 25 wherein said chain of pulses generated in said time base generator means describes polarity time dwell of said lamp.

27. Apparatus according to claim 25 further including switching logic means for converting said chain of pulses from said time base generator means into two pulse chains.

28. Apparatus according to claim 27 wherein said switching logic means comprises monostable multivibrator means for supplying a trigger pulse to flip-flop means used to convert said chain of pulses to regenerated timing chain of pulses and having identical spacing.

* * * * *